(12) United States Patent
Morris et al.

(10) Patent No.: US 9,447,806 B2
(45) Date of Patent: Sep. 20, 2016

(54) SELF-RETAINING ALIGNMENT SYSTEM FOR PROVIDING PRECISE ALIGNMENT AND RETENTION OF COMPONENTS

(71) Applicant: GM Global Technology Operations LLC, Detroit, MI (US)

(72) Inventors: Steven E. Morris, Fair Haven, MI (US); Jennifer P. Lawall, Waterford, MI (US); Toure D. Lee, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 277 days.

(21) Appl. No.: 14/104,327

(22) Filed: Dec. 12, 2013

(65) Prior Publication Data
US 2015/0165609 A1 Jun. 18, 2015

(51) Int. Cl.
B25B 27/14 (2006.01)
B25B 27/04 (2006.01)
(Continued)

(52) U.S. Cl.
CPC ............ *F16B 19/002* (2013.01); *F16B 5/0628* (2013.01); *F16B 5/065* (2013.01); *F16B 5/0664* (2013.01); *F16B 19/004* (2013.01)

(58) Field of Classification Search
CPC ...... B62D 27/02; B62D 27/14; B62D 27/06; B62D 27/023; B62D 27/04; F16B 17/00; F16B 19/002; F16B 5/0628; Y10T 403/33; Y10T 403/335; Y10T 403/4634; B25B 11/02; B23P 19/04
USPC ....... 403/13, 280, 353, 362, 52, 76, 71, 346, 403/14; 269/47, 50, 51, 52, 76, 321, 287, 269/289 R; 428/597; 29/428, 281.5, 271, 29/281.1; 206/557
See application file for complete search history.

(56) References Cited

U.S. PATENT DOCUMENTS 419,358 A * 1/1890 Raymond ................ B61G 1/06
213/175
1,219,398 A 3/1917 Huntsman
(Continued)

FOREIGN PATENT DOCUMENTS

BE 842302 A 9/1976
CN 1036250 A 10/1989
(Continued)

OTHER PUBLICATIONS

An anti-backlash two-part shaft coupling with interlocking elastically averaged teeth by Mahadevan Balasubramaniam, Edmund Golaski, Seung-kil Son, Krishnan Sriram, Alexander Slocum; Elseveir 2002.*

(Continued)

*Primary Examiner* — Monica Carter
*Assistant Examiner* — Mahdi H Nejad
(74) *Attorney, Agent, or Firm* — Cantor Colburn LLP (57) ABSTRACT

An elastically averaging self-retaining alignment system includes a first component and a second component. The first component includes a first alignment member and an elastically deformable alignment element fixedly disposed with respect to the first alignment member, the alignment element having a hollow tube. The second component includes a second alignment member and an alignment feature fixedly disposed with respect to the second alignment member, the alignment feature having an aperture with a plurality of inwardly extending tabs. The elastically deformable alignment element is configured and disposed to interferingly, deformably and matingly engage the alignment feature. Portions of the elastically deformable alignment element when inserted into the alignment feature elastically deform to an elastically averaged final configuration that aligns and retains the first component relative to the second component in at least two of four planar orthogonal directions.

11 Claims, 5 Drawing Sheets

(51) Int. Cl.
*F16B 19/00* (2006.01)
*F16B 5/06* (2006.01)

(56) References Cited

U.S. PATENT DOCUMENTS

| | | | |
|---|---|---|---|
| 1,261,036 A | 4/1918 | Kerns | |
| 1,301,302 A | 4/1919 | Nolan | |
| 1,556,233 A | 10/1925 | Maise | |
| 1,819,126 A | 8/1931 | Scheibe | |
| 1,929,848 A | 10/1933 | Neely | |
| 1,968,168 A | 7/1934 | Place | |
| 1,982,076 A | 11/1934 | Spahn | |
| 1,999,990 A | 4/1935 | Carr | |
| 2,006,525 A | 7/1935 | Thal | |
| 2,267,558 A | 12/1941 | Birger, et al. | |
| 2,275,103 A | 3/1942 | Gooch, et al. | |
| 2,275,900 A | 3/1942 | Hall | |
| 2,385,180 A | 9/1945 | Allen | |
| 2,482,488 A | 9/1949 | Franc | |
| 2,560,530 A * | 7/1951 | Burdick | F16B 5/06 |
| | | | 411/508 |
| 2,612,139 A | 9/1952 | Collins | |
| 2,688,894 A | 9/1954 | Modrey | |
| 2,693,014 A | 11/1954 | Monahan | |
| 2,707,607 A | 5/1955 | O'Connor | |
| 2,778,399 A | 1/1957 | Mroz | |
| 2,780,128 A | 2/1957 | Rapata | |
| 2,788,046 A | 4/1957 | Joseph | |
| 2,862,040 A | 11/1958 | Curran | |
| 2,902,902 A | 9/1959 | Slone | |
| 2,940,149 A | 6/1960 | O'Connor | |
| 2,946,612 A | 7/1960 | Ahlgren | |
| 2,958,230 A * | 11/1960 | Gottfrid | F16B 5/045 |
| | | | 29/463 |
| 3,005,282 A * | 10/1961 | Christiansen | A63H 33/086 |
| | | | 446/128 |
| 3,014,563 A | 12/1961 | Bratton | |
| 3,087,352 A | 4/1963 | Daniel | |
| 3,089,269 A | 5/1963 | McKiernan | |
| 3,130,512 A | 4/1964 | Van Buren, Jr. | |
| 3,152,376 A | 10/1964 | Boser | |
| 3,168,961 A | 2/1965 | Yates | |
| 3,169,004 A | 2/1965 | Rapata | |
| 3,169,439 A | 2/1965 | Rapata | |
| 3,188,731 A | 6/1965 | Sweeney | |
| 3,194,292 A | 7/1965 | Borowsky | |
| 3,213,189 A | 10/1965 | Mitchell et al. | |
| 3,230,592 A | 1/1966 | Hosea | |
| 3,233,358 A | 2/1966 | Dehm | |
| 3,233,503 A | 2/1966 | Birger | |
| 3,244,057 A | 4/1966 | Mathison | |
| 3,248,995 A | 5/1966 | Meyer | |
| 3,291,495 A | 12/1966 | Liebig | |
| 3,310,929 A | 3/1967 | Garvey | |
| 3,413,752 A | 12/1968 | Perry | |
| 3,473,283 A | 10/1969 | Meyer | |
| 3,531,850 A | 10/1970 | Durand | |
| 3,551,963 A | 1/1971 | Long | |
| 3,643,968 A | 2/1972 | Horvath | |
| 3,669,484 A | 6/1972 | Bernitz | |
| 3,680,272 A | 8/1972 | Meyer | |
| 3,733,655 A | 5/1973 | Kolibar | |
| 3,800,369 A | 4/1974 | Nikolits | |
| 3,841,044 A | 10/1974 | Brown | |
| 3,841,682 A | 10/1974 | Church | |
| 3,842,565 A | 10/1974 | Brown et al. | |
| 3,845,961 A | 11/1974 | Byrd, III | |
| 3,847,492 A | 11/1974 | Kennicutt et al. | |
| 3,860,209 A | 1/1975 | Strecker | |
| 3,868,804 A | 3/1975 | Tantlinger | |
| 3,895,408 A | 7/1975 | Leingang | |
| 3,897,967 A | 8/1975 | Barenyi | |
| 3,905,570 A | 9/1975 | Nieuwveld | |
| 3,972,550 A | 8/1976 | Boughton | |
| 3,988,808 A * | 11/1976 | Poe | F16B 21/02 |
| | | | 24/297 |
| 4,035,874 A | 7/1977 | Liljendahl | |
| 4,039,215 A | 8/1977 | Minhinnick | |
| 4,042,307 A | 8/1977 | Jarvis | |
| 4,043,585 A | 8/1977 | Yamanaka | |
| 4,158,511 A | 6/1979 | Herbenar | |
| 4,169,297 A | 10/1979 | Weihrauch | |
| 4,193,588 A * | 3/1980 | Doneaux | A61J 11/00 |
| | | | 269/287 |
| 4,213,675 A | 7/1980 | Pilhall | |
| 4,237,573 A | 12/1980 | Weihrauch | |
| 4,267,680 A | 5/1981 | Delattre | |
| 4,300,851 A | 11/1981 | Thelander | |
| 4,313,609 A | 2/1982 | Clements | |
| 4,318,208 A | 3/1982 | Borja | |
| 4,325,574 A | 4/1982 | Umemoto et al. | |
| 4,358,166 A | 11/1982 | Antoine | |
| 4,363,839 A | 12/1982 | Watanabe et al. | |
| 4,364,150 A | 12/1982 | Remington | |
| 4,384,803 A | 5/1983 | Cachia | |
| 4,394,853 A | 7/1983 | Lopez-Crevillen et al. | |
| 4,406,033 A | 9/1983 | Chisholm et al. | |
| 4,407,413 A | 10/1983 | Jansson | |
| 4,477,142 A | 10/1984 | Cooper | |
| 4,481,160 A | 11/1984 | Bree | |
| 4,527,760 A | 7/1985 | Salacuse | |
| 4,575,060 A * | 3/1986 | Kitagawa | F16B 5/065 |
| | | | 174/138 D |
| 4,591,203 A | 5/1986 | Furman | |
| 4,599,768 A | 7/1986 | Doyle | |
| 4,605,575 A | 8/1986 | Auld et al. | |
| 4,616,951 A | 10/1986 | Maatela | |
| 4,648,649 A | 3/1987 | Beal | |
| 4,654,760 A | 3/1987 | Matheson et al. | |
| 4,672,732 A | 6/1987 | Ramspacher | |
| 4,745,656 A | 5/1988 | Revlett | |
| 4,757,655 A | 7/1988 | Nentoft | |
| 4,767,647 A | 8/1988 | Bree | |
| 4,805,272 A | 2/1989 | Yamaguchi | |
| 4,807,335 A | 2/1989 | Candea | |
| 4,817,999 A | 4/1989 | Drew | |
| 4,819,983 A | 4/1989 | Alexander et al. | |
| 4,843,975 A | 7/1989 | Welsch | |
| 4,843,976 A | 7/1989 | Pigott et al. | |
| 4,865,502 A | 9/1989 | Maresch | |
| 4,881,764 A | 11/1989 | Takahashi et al. | |
| 4,917,426 A | 4/1990 | Copp | |
| 4,973,212 A | 11/1990 | Jacobs | |
| 4,977,648 A | 12/1990 | Eckerud | |
| 5,005,265 A | 4/1991 | Muller | |
| 5,039,267 A | 8/1991 | Wollar | |
| 5,100,015 A | 3/1992 | Vanderstuyf | |
| 5,111,557 A | 5/1992 | Baum | |
| 5,139,285 A | 8/1992 | Lasinski | |
| 5,154,479 A | 10/1992 | Sautter, Jr. | |
| 5,165,749 A | 11/1992 | Sheppard | |
| 5,170,985 A | 12/1992 | Killworth et al. | |
| 5,180,219 A | 1/1993 | Geddie | |
| 5,208,507 A | 5/1993 | Jung | |
| 5,212,853 A | 5/1993 | Kaneko | |
| 5,234,122 A | 8/1993 | Cherng | |
| 5,250,001 A | 10/1993 | Hansen | |
| 5,297,322 A | 3/1994 | Kraus | |
| 5,309,663 A | 5/1994 | Shirley | |
| 5,333,965 A | 8/1994 | Mailey | |
| 5,339,491 A | 8/1994 | Sims | |
| 5,342,139 A | 8/1994 | Hoffman | |
| 5,348,356 A | 9/1994 | Moulton | |
| 5,368,427 A | 11/1994 | Pfaffinger | |
| 5,368,797 A | 11/1994 | Quentin et al. | |
| 5,397,206 A | 3/1995 | Sihon | |
| 5,407,310 A | 4/1995 | Kassouni | |
| 5,446,965 A | 9/1995 | Makridis | |
| 5,507,610 A | 4/1996 | Benedetti et al. | |
| 5,513,603 A | 5/1996 | Ang et al. | |
| 5,524,786 A | 6/1996 | Skudlarek | |
| 5,538,079 A | 7/1996 | Pawlick | |
| 5,556,808 A | 9/1996 | Williams et al. | |

(56) References Cited

U.S. PATENT DOCUMENTS

| | | | |
|---|---|---|---|
| 5,566,840 A * | 10/1996 | Waldner | G03F 9/00 |
| | | | 211/41.17 |
| 5,575,601 A | 11/1996 | Skufca | |
| 5,577,301 A | 11/1996 | Demaagd | |
| 5,577,779 A | 11/1996 | Dangel | |
| 5,580,204 A | 12/1996 | Hultman | |
| 5,586,372 A | 12/1996 | Eguchi et al. | |
| 5,593,265 A | 1/1997 | Kizer | |
| 5,601,453 A | 2/1997 | Horchler | |
| 5,629,823 A | 5/1997 | Mizuta | |
| 5,634,757 A | 6/1997 | Schanz | |
| 5,657,516 A | 8/1997 | Berg et al. | |
| 5,667,271 A | 9/1997 | Booth | |
| 5,670,013 A | 9/1997 | Huang et al. | |
| 5,698,276 A | 12/1997 | Mirabitur | |
| 5,706,559 A | 1/1998 | Oliver | |
| 5,736,221 A | 4/1998 | Hardigg et al. | |
| 5,765,942 A | 6/1998 | Shirai et al. | |
| 5,775,860 A | 7/1998 | Meyer | |
| 5,795,118 A | 8/1998 | Osada et al. | |
| 5,797,170 A | 8/1998 | Akeno | |
| 5,797,714 A | 8/1998 | Oddenino | |
| 5,803,646 A | 9/1998 | Weihrauch | |
| 5,806,915 A | 9/1998 | Takabatake | |
| 5,810,535 A | 9/1998 | Fleckenstein et al. | |
| 5,820,292 A | 10/1998 | Fremstad | |
| 5,846,631 A | 12/1998 | Nowosiadly | |
| 5,920,200 A * | 7/1999 | Pendse | G01R 1/06705 |
| | | | 324/750.25 |
| 5,929,382 A | 7/1999 | Moore | |
| 5,931,514 A | 8/1999 | Chung | |
| 5,934,729 A | 8/1999 | Baack | |
| 5,941,673 A | 8/1999 | Hayakawa et al. | |
| 5,988,678 A | 11/1999 | Nakamura | |
| 6,006,941 A | 12/1999 | Hitchings | |
| 6,010,306 A | 1/2000 | Bucher | |
| 6,062,763 A | 5/2000 | Sirois et al. | |
| 6,073,315 A | 6/2000 | Rasmussen | |
| 6,079,083 A | 6/2000 | Akashi | |
| 6,095,594 A | 8/2000 | Riddle et al. | |
| 6,103,987 A * | 8/2000 | Nordquist | B23H 11/003 |
| | | | 219/68 |
| 6,109,882 A | 8/2000 | Popov | |
| 6,152,436 A * | 11/2000 | Sonderegger | B23H 7/26 |
| | | | 204/224 M |
| 6,164,603 A | 12/2000 | Kawai | |
| 6,193,430 B1 * | 2/2001 | Culpepper | B23P 19/10 |
| | | | 403/11 |
| 6,199,248 B1 | 3/2001 | Akashi | |
| 6,202,962 B1 | 3/2001 | Snyder | |
| 6,209,175 B1 | 4/2001 | Gershenson | |
| 6,209,178 B1 | 4/2001 | Wiese et al. | |
| 6,254,304 B1 | 7/2001 | Takizawa et al. | |
| 6,264,869 B1 | 7/2001 | Notarpietro et al. | |
| 6,289,560 B1 | 9/2001 | Guyot | |
| 6,299,478 B1 * | 10/2001 | Jones | F16B 2/06 |
| | | | 439/571 |
| 6,318,585 B1 | 11/2001 | Asagiri | |
| 6,321,495 B1 | 11/2001 | Oami | |
| 6,336,767 B1 * | 1/2002 | Nordquist | B23H 7/26 |
| | | | 403/282 |
| 6,345,420 B1 | 2/2002 | Nabeshima | |
| 6,349,904 B1 | 2/2002 | Polad | |
| 6,351,380 B1 | 2/2002 | Curlee | |
| 6,354,815 B1 | 3/2002 | Svihla et al. | |
| 6,378,931 B1 | 4/2002 | Kolluri et al. | |
| 6,398,449 B1 | 6/2002 | Loh | |
| 6,470,540 B2 | 10/2002 | Aamodt et al. | |
| 6,484,370 B2 | 11/2002 | Kanie et al. | |
| 6,485,241 B1 | 11/2002 | Oxford | |
| 6,498,297 B2 | 12/2002 | Samhammer | |
| 6,523,229 B2 | 2/2003 | Severson | |
| 6,523,817 B1 | 2/2003 | Landry, Jr. | |
| 6,533,391 B1 | 3/2003 | Pan | |
| 6,543,979 B2 | 4/2003 | Iwatsuki | |
| 6,557,260 B1 | 5/2003 | Morris | |
| 6,568,701 B1 | 5/2003 | Burdack et al. | |
| 6,579,397 B1 | 6/2003 | Spain et al. | |
| 6,591,801 B1 | 7/2003 | Fonville | |
| 6,609,717 B2 | 8/2003 | Hinson | |
| 6,637,095 B2 * | 10/2003 | Stumpf | B29C 66/81423 |
| | | | 156/293 |
| 6,658,698 B2 | 12/2003 | Chen | |
| 6,662,411 B2 | 12/2003 | Rubenstein | |
| 6,664,470 B2 | 12/2003 | Nagamoto | |
| 6,668,424 B1 | 12/2003 | Allen | |
| 6,677,065 B2 | 1/2004 | Blauer | |
| 6,692,016 B2 | 2/2004 | Yokota | |
| 6,712,329 B2 | 3/2004 | Ishigami et al. | |
| 6,746,172 B2 | 6/2004 | Culpepper | |
| 6,757,942 B2 | 7/2004 | Matsui | |
| 6,799,758 B2 | 10/2004 | Fries | |
| 6,821,091 B2 | 11/2004 | Lee | |
| 6,840,969 B2 | 1/2005 | Kobayashi et al. | |
| 6,857,676 B2 | 2/2005 | Kawaguchi et al. | |
| 6,857,809 B2 | 2/2005 | Granata | |
| 6,872,053 B2 | 3/2005 | Bucher | |
| 6,908,117 B1 | 6/2005 | Pickett, Jr. et al. | |
| 6,932,416 B2 | 8/2005 | Clauson | |
| 6,948,753 B2 | 9/2005 | Yoshida et al. | |
| 6,951,349 B2 | 10/2005 | Yokota | |
| 6,957,939 B2 | 10/2005 | Wilson | |
| 6,959,954 B2 | 11/2005 | Brandt et al. | |
| 6,966,601 B2 | 11/2005 | Matsumoto et al. | |
| 6,971,831 B2 | 12/2005 | Fattori et al. | |
| 6,997,487 B2 | 2/2006 | Kitzis | |
| 7,000,941 B2 | 2/2006 | Yokota | |
| 7,008,003 B1 | 3/2006 | Hirose et al. | |
| 7,014,094 B2 | 3/2006 | Alcoe | |
| 7,017,239 B2 | 3/2006 | Kurily et al. | |
| 7,036,779 B2 | 5/2006 | Kawaguchi et al. | |
| 7,055,785 B1 | 6/2006 | Diggle, III | |
| 7,055,849 B2 | 6/2006 | Yokota | |
| 7,059,628 B2 | 6/2006 | Yokota | |
| 7,073,260 B2 | 7/2006 | Jensen | |
| 7,089,998 B2 | 8/2006 | Crook | |
| 7,097,198 B2 | 8/2006 | Yokota | |
| 7,121,611 B2 | 10/2006 | Hirotani et al. | |
| 7,144,183 B2 | 12/2006 | Lian et al. | |
| 7,165,310 B2 * | 1/2007 | Murakami | B21D 39/032 |
| | | | 29/505 |
| 7,172,210 B2 | 2/2007 | Yokota | |
| 7,178,855 B2 | 2/2007 | Catron et al. | |
| 7,198,315 B2 | 4/2007 | Cass et al. | |
| 7,207,758 B2 | 4/2007 | Leon et al. | |
| 7,234,852 B2 | 6/2007 | Nishizawa et al. | |
| 7,275,296 B2 | 10/2007 | DiCesare | |
| 7,306,418 B2 | 12/2007 | Kornblum | |
| 7,322,500 B2 | 1/2008 | Maierholzner | |
| 7,344,056 B2 | 3/2008 | Shelmon et al. | |
| 7,360,964 B2 | 4/2008 | Tsuya | |
| 7,369,408 B2 | 5/2008 | Chang | |
| 7,435,031 B2 | 10/2008 | Granata | |
| 7,454,105 B2 | 11/2008 | Yi | |
| 7,487,884 B2 | 2/2009 | Kim | |
| 7,493,716 B2 | 2/2009 | Brown | |
| 7,500,440 B2 | 3/2009 | Chiu | |
| 7,547,061 B2 | 6/2009 | Horimatsu | |
| 7,557,051 B2 | 7/2009 | Ryu et al. | |
| 7,568,316 B2 | 8/2009 | Choby et al. | |
| 7,591,573 B2 | 9/2009 | Maliar et al. | |
| D602,349 S | 10/2009 | Andersson | |
| 7,614,836 B2 | 11/2009 | Mohiuddin | |
| 7,672,126 B2 | 3/2010 | Yeh | |
| 7,677,650 B2 | 3/2010 | Huttenlocher | |
| 7,727,667 B2 | 6/2010 | Sakurai | |
| 7,764,853 B2 | 7/2010 | Yi et al. | |
| 7,793,998 B2 | 9/2010 | Matsui et al. | |
| 7,802,831 B2 | 9/2010 | Isayama et al. | |
| 7,803,015 B2 | 9/2010 | Pham | |
| 7,828,372 B2 | 11/2010 | Ellison | |
| 7,832,693 B2 | 11/2010 | Moerke et al. | |
| 7,862,272 B2 | 1/2011 | Nakajima | |
| 7,869,003 B2 | 1/2011 | Van Doren et al. | |

(56) References Cited

U.S. PATENT DOCUMENTS

| | | |
|---|---|---|
| 7,883,137 B2 | 2/2011 | Bar |
| 7,891,926 B2 | 2/2011 | Jackson, Jr. |
| 7,922,415 B2 | 4/2011 | Rudduck et al. |
| 7,946,684 B2 | 5/2011 | Drury et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,206,029 B2 * | 6/2012 | Vaucher ............... G04B 13/022 29/893.2 |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 * | 11/2012 | Dunn .................. A47L 15/505 134/135 |
| 8,371,788 B2 | 2/2013 | Lange |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,572,818 B2 | 11/2013 | Hofmann |
| 8,579,141 B2 | 11/2013 | Tejima |
| 8,619,504 B2 | 12/2013 | Wyssbrod |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,773,846 B2 | 7/2014 | Wang |
| 8,811,004 B2 | 8/2014 | Liu |
| 8,826,499 B2 | 9/2014 | Tempesta |
| 8,833,771 B2 * | 9/2014 | Lesnau, IV .......... F16J 15/061 277/591 |
| 8,833,832 B2 | 9/2014 | Whipps |
| 8,834,058 B2 | 9/2014 | Woicke |
| 8,905,812 B2 * | 12/2014 | Pai-Chen ............. A63H 33/086 446/122 |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,403 B2 * | 6/2015 | Colombo ............... B25B 27/00 |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 2001/0016986 A1 | 8/2001 | Bean |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0130239 A1 | 9/2002 | Ishigami et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0051221 A1 * | 3/2004 | Sunadome .......... B23Q 16/001 269/47 |
| 2004/0052574 A1 * | 3/2004 | Grubb .................... B23K 26/28 403/270 |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0217088 A1 | 10/2005 | Lin |
| 2005/0244250 A1 * | 11/2005 | Okada .................... F16B 5/065 411/508 |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yu |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0258756 A1 | 11/2007 | Olshausen |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0196535 A1 | 8/2008 | Dole |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh |
| 2009/0154303 A1 * | 6/2009 | Vaucher ............... G04B 13/022 368/322 |
| 2009/0174207 A1 | 7/2009 | Lota |
| 2009/0211804 A1 | 8/2009 | Zhou et al. |
| 2009/0243172 A1 | 10/2009 | Ting et al. |
| 2009/0265896 A1 | 10/2009 | Beak |
| 2009/0309388 A1 | 12/2009 | Ellison |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |

(56) References Cited

U.S. PATENT DOCUMENTS

| | | |
|---|---|---|
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1* | 6/2011 | Morgan ............... F16M 11/041 29/428 |
| 2011/0175376 A1 | 7/2011 | Whitens et al. |
| 2011/0183152 A1* | 7/2011 | Lanham ............... G01F 1/8413 428/597 |
| 2011/0191990 A1 | 8/2011 | Beaulieu |
| 2011/0191993 A1 | 8/2011 | Forrest |
| 2011/0207024 A1 | 8/2011 | Bogumil et al. |
| 2001/0239375 | 10/2011 | Huang |
| 2011/0239418 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1* | 11/2012 | Morgan ............... F16M 11/041 384/590 |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1* | 1/2013 | Colombo ............... B25B 27/00 29/464 |
| 2013/0019455 A1* | 1/2013 | Morris ............... B25B 27/14 29/466 |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1* | 2/2014 | Morris ............... F16B 17/00 29/407.09 |
| 2014/0041176 A1 | 2/2014 | Morris |
| 2014/0041185 A1* | 2/2014 | Morris ............... F16B 17/00 29/407.09 |
| 2014/0041199 A1* | 2/2014 | Morris ............... B23P 19/04 29/468 |
| 2014/0042704 A1 | 2/2014 | Polewarczyk |
| 2014/0047691 A1* | 2/2014 | Colombo ............... B25B 11/02 29/407.09 |
| 2014/0047697 A1 | 2/2014 | Morris |
| 2014/0080036 A1 | 3/2014 | Smith et al. |
| 2014/0132023 A1 | 5/2014 | Watanabe |
| 2014/0172112 A1 | 6/2014 | Marter |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0208561 A1* | 7/2014 | Colombo ............... F16B 1/0071 29/407.1 |
| 2014/0208572 A1 | 7/2014 | Colombo et al. |
| 2014/0220267 A1 | 8/2014 | Morris et al. |
| 2014/0264206 A1 | 9/2014 | Morris |
| 2014/0292013 A1* | 10/2014 | Colombo ............... B62D 27/04 296/29 |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1* | 10/2014 | Morris ............... B62D 27/023 296/97.23 |
| 2014/0301103 A1* | 10/2014 | Colombo ............... B60Q 1/045 362/522 |
| 2014/0301777 A1 | 10/2014 | Morris et al. |
| 2014/0301778 A1* | 10/2014 | Morris ............... F16B 17/002 403/280 |
| 2014/0360824 A1* | 12/2014 | Morris ............... F16F 3/0873 188/268 |
| 2014/0360826 A1 | 12/2014 | Morris et al. |
| 2014/0366326 A1 | 12/2014 | Colombo et al. |
| 2014/0369742 A1* | 12/2014 | Morris ............... F16B 17/002 403/280 |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1* | 1/2015 | Morris ............... F16B 5/0664 403/14 |
| 2015/0043959 A1 | 2/2015 | Morris |
| 2015/0050068 A1* | 2/2015 | Morris ............... B62D 27/02 403/14 |
| 2015/0052725 A1 | 2/2015 | Morris et al. |
| 2015/0056009 A1* | 2/2015 | Morris ............... F16B 21/08 403/326 |
| 2015/0063943 A1* | 3/2015 | Morris ............... F16B 39/284 411/33 |
| 2015/0069779 A1* | 3/2015 | Morris ............... B62D 27/04 296/35.1 |
| 2015/0078805 A1* | 3/2015 | Morris ............... E05B 85/10 403/13 |
| 2015/0086265 A1 | 3/2015 | Morris |
| 2015/0093177 A1 | 4/2015 | Morris |
| 2015/0093178 A1* | 4/2015 | Morris ............... B62D 27/02 403/13 |
| 2015/0093179 A1* | 4/2015 | Morris ............... B62D 27/02 403/13 |
| 2015/0098748 A1* | 4/2015 | Morris ............... B62D 27/02 403/13 |
| 2015/0115656 A1* | 4/2015 | Lungershausen .. B62D 25/2036 296/187.12 |
| 2015/0135509 A1 | 5/2015 | Morris et al. |
| 2015/0165609 A1* | 6/2015 | Morris ............... F16B 19/002 269/52 |
| 2015/0165985 A1 | 6/2015 | Morris |
| 2015/0165986 A1 | 6/2015 | Morris |
| 2015/0166124 A1* | 6/2015 | Morris ............... F16B 21/071 296/193.01 |
| 2015/0167717 A1* | 6/2015 | Morris ............... F16B 21/071 403/14 |
| 2015/0167718 A1 | 6/2015 | Morris et al. |
| 2015/0174740 A1 | 6/2015 | Morris et al. |
| 2015/0175091 A1 | 6/2015 | Morris et al. |
| 2015/0175217 A1* | 6/2015 | Morris ............... B62D 27/023 296/193.01 |
| 2015/0175219 A1* | 6/2015 | Kiester ............... B62D 27/04 296/187.01 |
| 2015/0176759 A1 | 6/2015 | Morris et al. |
| 2015/0194650 A1* | 7/2015 | Morris ............... H01M 2/1083 429/100 |
| 2015/0197970 A1 | 7/2015 | Morris et al. |
| 2015/0232130 A1 | 8/2015 | Colombo |
| 2015/0232131 A1* | 8/2015 | Morris ............... B62D 27/04 403/14 |
| 2015/0274217 A1* | 10/2015 | Colombo ............... F16B 5/065 403/14 |
| 2015/0291222 A1 | 10/2015 | Colombo et al. |
| 2015/0375798 A1 | 12/2015 | Morris et al. |

FOREIGN PATENT DOCUMENTS

| | | |
|---|---|---|
| CN | 1129162 A | 8/1996 |
| CN | 2285844 Y | 7/1998 |
| CN | 1205285 A | 1/1999 |
| CN | 1204744 A | 7/1999 |

(56) References Cited

FOREIGN PATENT DOCUMENTS

| | | |
|---|---|---|
| CN | 1328521 A | 12/2001 |
| CN | 1426872 A | 7/2003 |
| CN | 1496451 A | 5/2004 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2872795 Y | 2/2007 |
| CN | 1933747 A | 3/2007 |
| CN | 2888807 Y | 4/2007 |
| CN | 1961157 A | 5/2007 |
| CN | 2915389 Y | 6/2007 |
| CN | 101005741 A | 7/2007 |
| CN | 200941716 Y | 8/2007 |
| CN | 101250964 A | 4/2008 |
| CN | 101390022 A | 3/2009 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202024057 U | 11/2011 |
| CN | 202079532 U | 12/2011 |
| CN | 102313952 A | 1/2012 |
| CN | 202132326 U | 2/2012 |
| CN | 102540855 A | 7/2012 |
| CN | 102756633 | 10/2012 |
| CN | 102803753 A | 11/2012 |
| CN | 202561269 U | 11/2012 |
| CN | 102817892 A | 12/2012 |
| CN | 102869891 A | 1/2013 |
| CN | 102904128 A | 1/2013 |
| CN | 202686206 U | 1/2013 |
| CN | 102939022 A | 2/2013 |
| CN | 202764872 U | 3/2013 |
| CN | 202987018 U | 6/2013 |
| CN | 103201525 A | 7/2013 |
| CN | 103206596 A | 7/2013 |
| CN | 203189459 U | 9/2013 |
| CN | 203344856 U | 12/2013 |
| CN | 104100609 A | 10/2014 |
| CN | 203991175 U | 12/2014 |
| DE | 1220673 B | 7/1966 |
| DE | 2527023 A1 | 12/1976 |
| DE | 2736012 A1 | 2/1978 |
| DE | 2703897 A1 | 8/1978 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 0616140 A2 | 9/1994 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 1550818 A1 | 7/2005 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 155838 | 3/1922 |
| GB | 994891 | 6/1965 |
| GB | 2175626 A | 12/1986 |
| GB | 2281950 A | 3/1995 |
| GB | 2348924 A | 10/2000 |
| JP | H08200420 A | 8/1996 |
| JP | H0942233 A | 2/1997 |
| JP | 2000010514 A | 1/2000 |
| JP | 2001141154 A | 5/2001 |
| JP | 2001171554 A | 6/2001 |
| JP | 2003158387 A | 5/2003 |
| JP | 2003314515 A | 11/2003 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2011085174 A | 4/2011 |
| JP | 2012060791 A | 3/2012 |
| JP | 2012112533 A | 6/2012 |
| KR | 20030000251 A1 | 1/2003 |
| KR | 100931019 B1 | 12/2009 |
| WO | 9602963 A1 | 2/1996 |
| WO | 9822739 A1 | 5/1998 |
| WO | 0055517 A2 | 3/2000 |
| WO | 0132454 A3 | 11/2001 |
| WO | 2004010011 01 | 1/2004 |
| WO | 2007126201 A1 | 11/2007 |
| WO | 2008140659 A1 | 11/2008 |
| WO | 2010105354 A1 | 9/2010 |
| WO | 2011025606 | 3/2011 |
| WO | 2013088447 A1 | 6/2013 |
| WO | 2013191622 A1 | 12/2013 |

OTHER PUBLICATIONS

Kinematic and Elastically Averaged Joints: Connecting the Past, Present and Future by Alexander et al.; International Symposium on Ultraprecision Engineering and Nanotechnology, Tokyo, Japan, Mar. 13, 2013.*
Elastically Averaged Precision Alignment; by Patrick Willoughby B. S. Mechanical Engineering University of Pittsburgh, 2000.*
Kinematic Coupling for Precision Fixturing & Assembly; Folkers E. Rojas, MS & Nevan C. Hanumara, PhD MIT Precision Engineering Research Group; Apr. 2013.*
Kinematic and Elastically Averaged Joints: Connecting the Past, Present and Future; Alexander H. Slocum1 Michael A. Chiu1;Eric D. Hobbs2;Gerald Rothenhöfer3;Akinori Yui4; Mar. 13, 2013.*
"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

(56) References Cited

OTHER PUBLICATIONS

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.
"Elastic Averaging in Flexture Mechanisms: A Multi-Beam Paralleaogram Flexture Case-Study" by Shorya Awtar and Edip Sevincer, Proceedings of IDETC/CIE 2006, Paper DETC2006-99752, American Society of Mechanical Engineers (ASME), Sep. 2006.
"Passive Alignment of Micro-Fluidic Chips Using the Principle of Elastic Averaging" by Sitanshu Gurung, Thesis, Louisiana State University, Dept. of Mechanical Engineering, Dec. 2007.
"Precision Connector Assembly Using Elastic Averaging" by Patrick J. Willoughby and Alexander H. Slocum, Massachusetts Institute of Technology (MIT), Cambridge, MA, American Society for Precision Engineering, 2004.
"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.
Balasubramaniam, M., Golaski, E., Son, S., Sriram, K. & Slocum, A. (Jul. 2002). An Anti Backlash Two-Part Shaft Coupling with Interlocking Elastically Averaged Teeth. Precision Engineering, vol. 26, No. 3, Elsevier Publishing.
Cross-sectional view of a prior art infrared welded assembly of BMW, Munich, Germany. Believed on the market since about Jan. 1, 2010.
U.S. Appl. No. 13/915,132, filed on Jun. 11, 2013, entitled "Elastically Deformable Energy Management Arrangement and Method of Managing Energy Absorption," inventors: Steven E. Morris, Randy A. Johnson and Jennifer P. Lawall.
U.S. Appl. No. 13/915,177, filed on Jun. 11, 2013, entitled "Elastically Deformable Energy Management Assembly and Method of Managing Energy Absorption," inventors: Steven E. Morris, James M. Kushner, Victoria L. Enyedy, Jennifer P.
U.S. Appl. No. 13/915,177, filed on Jun. 11, 2013, entitled "Elastically Deformable Energy Management Assembly and Method of Managing Energy Absorption," inventors: Steven E. Morris, Jennifer P. Lawall, and Randy Johnson.
U.S. Appl. No. 13/917,005, filed on Jun. 13, 2013, entitled "Elastic Attachment Assembly and Method of Reducing Positional Variation and Increasing Stiffness," inventors: Steven E. Morris and Jennifer P. Lawall.
U.S. Appl. No. 13/917,074, filed on Jun. 13, 2013, entitled "Elastically Deformable Retaining Hook for Components to be Mated Together and Method of Assembling", inventors: Joel Colombo, Jeffrey L. Konchan, Steven E. Morris, and Stev.
U.S. Appl. No. 13/918,183, filed on Jun. 14, 2013, entitled "Elastic Retaining Assembly for Matable Components and Method of Assembling," inventors: Steven E. Morris and Jennifer P. Lawall.
U.S. Appl. No. 13/939,503, filed on Jul. 11, 2013, entitled "Elastically Averaged Alignment Systems and Methods," inventor: Joel Colombo.
U.S. Appl. No. 13/940,912, filed on Jul. 12, 2013, entitled "Alignment Arrangement for Mated Components and Method", inventors: Steven E. Morris and Jennifer P. Lawall.
U.S. Appl. No. 13/945,231, filed on Jul. 18, 2013, entitled "Lobular Elastic Tube Alignment System for Providing Precise Four-Way Alignment of Components", Inventors: Steven E. Morris and Jennifer P. Lawall.

U.S. Appl. No. 13/966,523, filed on Aug. 14, 2013, entitled "Elastically Averaged Alignment Systems and Methods Thereof," inventors: Steven E. Morris, Jennifer P. Lawall and Joel Colombo.
U.S. Appl. No. 13/973,587, filed on Aug. 22, 2013, entitled "Elastic Averaging Alignment System and Method," inventors: Steven E. Morris and Jennifer P. Lawall.
U.S. Appl. No. 13/974,729, filed on Aug. 23, 2013, entitled "Elastic Averaging Snap Member Aligning and Fastening System", inventors: Steven E. Morris and Jennifer P. Lawall.
U.S. Appl. No. 14/012,205, filed on Aug. 28, 2013, entitled "Elastically Deformable Alignment Fastener and System," inventors: Steven E Morris, Marc J. Tahnoose, Michael E McGuire and Jennifer P. Lawall.
U.S. Appl. No. 14/021,282, filed on Sep. 9, 2013, entitled "Elastic Tube Alignment and Fastening System for Providing Precise Alignment and Fastening of Components," inventors: Steven E. Morris and Jennifer P. Lawall.
U.S. Appl. No. 14/031,647, filed on Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.
U.S. Appl. No. 14/038,241, filed on Sep. 26, 2013, entitled "Serviceable Aligning and Self-Retaining Elastic Arrangement for Mated Components and Method," inventors: Steven E. Morris, Jennifer P. Lawall and Joel Colombo.
U.S. Appl. No. 14/039,614, filed on Sep. 27, 2013, entitled "Elastically Averaged Alignment Systems and Methods," inventor: Steven E. Morris.
U.S. Appl. No. 14/044,199, filed on Oct. 2, 2013, entitled "Lobular Elastic Tube Alignment and Retention System for Providing Precise Alignment of Components," inventors: Steven E. Morris and Jennifer P. Lawall.
U.S. Appl. No. 14/044,207, filed on Oct. 2, 2013, entitled "Elastic Aperture Alignment System for Providing Precise Four-Way Alignment of Components," inventors: Steven E. Morris and Jennifer P. Lawall.
U.S. Appl. No. 14/045,463, filed on Oct. 3, 2013, entitled "Elastically Averaged Alignment Systems and Methods," inventors: Steven E. Morris and Jennifer P. Lawall.
U.S. Appl. No. 14/081,361, filed on Nov. 15, 2013, entitled "Elastically Deformable Clip and Method," inventors: Steven E. Morris, Jennifer P. Lawall and Jeffrey M. Gace.
U.S. Appl. No. 14/104,321, filed on Dec. 12, 2013, entitled "Alignment and Retention System for a Flexible Assembly," inventors: Steven E. Morris and Jennifer P. Lawall.
U.S. Appl. No. 14/104,333, filed on Dec. 12, 2013, entitled "Alignment System for Providing Precise Alignment and Retention of Components of a Sealable Compartment, " inventors: Steven E. Morris, Christopher J. Georgi, Jennifer P. Law.
U.S. Appl. No. 14/104,541, filed on Dec. 12, 2013, entitled "Alignment and Retention System for Providing Precise Alignment and Retention of Components," inventors: Steven E. Morris and Jennifer P. Lawall.
U.S. Appl. No. 14/104,549, filed on Dec. 12, 2013, entitled "Alignment System for Providing Alignment of Components Having Contoured Features," inventors: Steven E. Morris and Jennifer P. Lawall.
Willoughby, P. & Slocum, A. (2004). Precision Connector Assembly using Elastic Averaging. Massachusetts Institute of Technology (MIT), Cambridge, MA, American Society for Precision Engineering.

\* cited by examiner

SELF-RETAINING ALIGNMENT SYSTEM FOR PROVIDING PRECISE ALIGNMENT AND RETENTION OF COMPONENTS

FIELD OF THE INVENTION

The subject invention relates to the art of alignment systems, more particularly to a self-retaining elastically averaged alignment system, and even more particularly to a self-retaining elastically averaged alignment system providing two-way and/or four-way alignment between a sheet metal stamping and a plastic component.

BACKGROUND

Currently, components, particularly vehicular components such as those found in automotive vehicles, which are to be mated together in a manufacturing process are mutually located with respect to each other by alignment features that are oversized and/or undersized to provide spacing to freely move the components relative to one another to align them without creating an interference therebetween that would hinder the manufacturing process. One example includes two-way and/or four-way male alignment features, typically upstanding bosses, which are received into corresponding female alignment features, typically apertures in the form of holes or slots. There is a clearance between the male alignment features and their respective female alignment features which is predetermined to match anticipated size and positional variation tolerances of the male and female alignment features as a result of manufacturing (or fabrication) variances. As a result, significant positional variation can occur between the mated first and second components having the aforementioned alignment features, which may contribute to the presence of undesirably large variation in their alignment, particularly with regard to the gaps and spacing between them. In the case where these misaligned components are also part of another assembly, such misalignments can also affect the function and/or aesthetic appearance of the entire assembly. Regardless of whether such misalignment is limited to two components or an entire assembly, it can negatively affect function and result in a perception of poor quality.

To align and secure components, the aforementioned male and female alignment features may be employed in combination with separate fastener components or a separate operation such as heat staking, for example, that serve to secure the components to each other. In such an assembly, the mating components are located relative to each other by the alignment features, and are fixed relative to each other by the separate fastener components. Use of separate alignment features and fastener components, one for alignment and the other for securement, may limit the effectiveness of each on a given assembly, as the alignment features cannot be employed where the fastener components are employed. Also, where heat staking is employed to fasten a metal component to a plastic component, the heat stake tool is typically designed to have a clearance to the metal component in order to avoid damage to the heat stake tool. With such a clearance, however, the resulting heat stake typically does not hold the metal component tight against the plastic component, which tends to produce a loosened assembly over time, requiring additional noise mitigation to be added to the assembly.

Accordingly, the art of alignment systems can be enhanced by providing a self-retaining alignment system or mechanism that can ensure precise two-way and/or four-way alignment and fastening of two components via elastic averaging of a single elastically deformable alignment element disposed in mating engagement with a corresponding single alignment and retention feature.

SUMMARY OF THE INVENTION

In an exemplary embodiment of the invention, an elastically averaging self-retaining alignment system is provided having a first component and a second component. The first component includes a first alignment member and an elastically deformable alignment element fixedly disposed with respect to the first alignment member, the alignment element having a hollow tube. The second component includes a second alignment member and an alignment feature fixedly disposed with respect to the second alignment member, the alignment feature having an aperture with a plurality of inwardly extending tabs. The elastically deformable alignment element is configured and disposed to interferingly, deformably and matingly engage the alignment feature. Portions of the elastically deformable alignment element when inserted into the alignment feature elastically deform to an elastically averaged final configuration that aligns and retains the first component relative to the second component in at least two of four planar orthogonal directions.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. For example, the embodiments shown comprise vehicle components but the alignment system may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, now U.S. Publication No. 2013-0019455A1, the disclosure of which is incorporated by reference herein in its entirety. The embodiments disclosed above provide the ability to convert an existing component that is not compatible with the above-described elastic averaging principles, or that would be further aided with the inclusion of a self-retaining elastic averaging alignment system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

Figure 1:
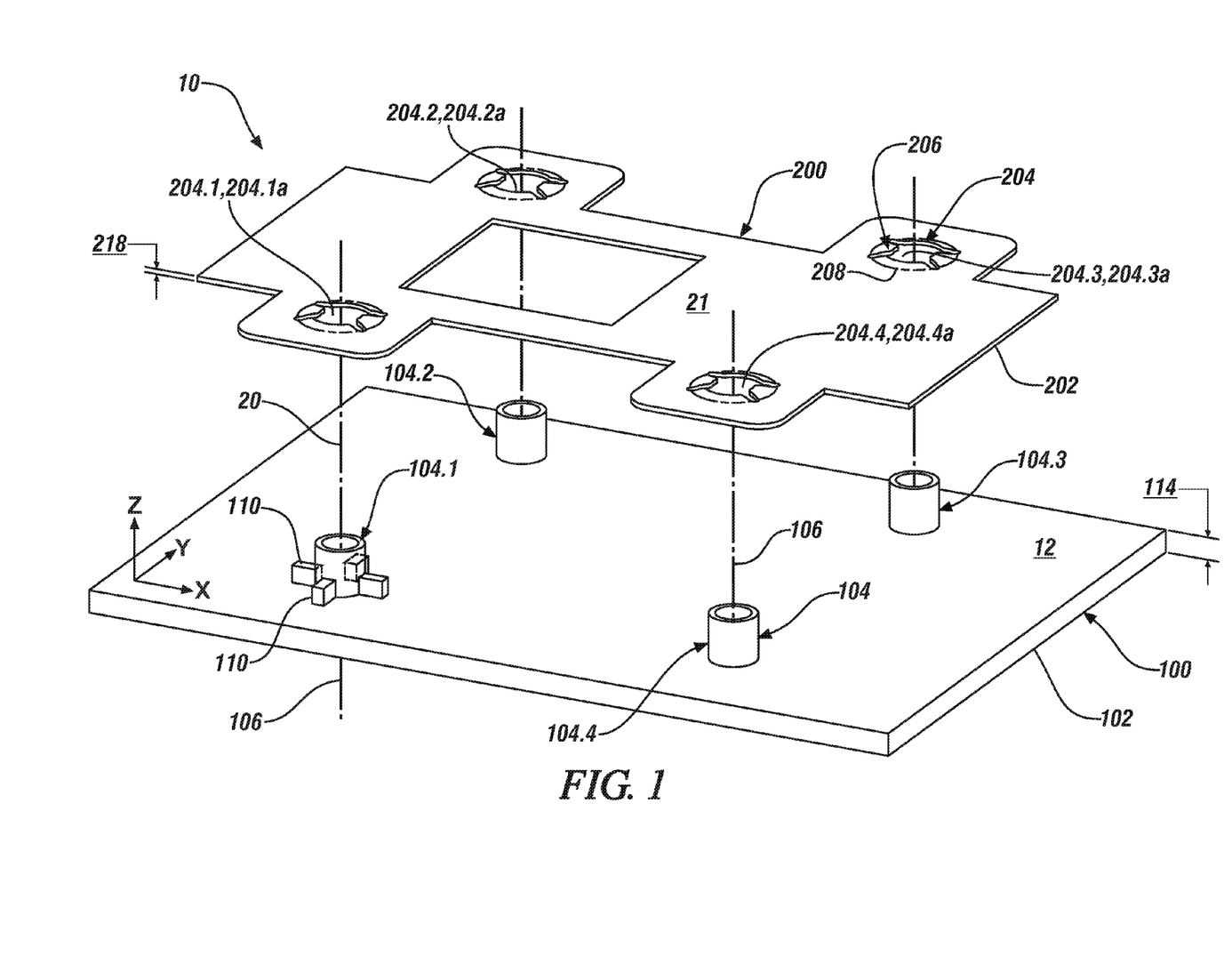
FIG. 1 depicts a perspective view of a disassembled elastically averaging self-retaining alignment system having first and second components, in accordance with an embodiment of the invention.

In accordance with an exemplary embodiment of the invention, and with reference to FIG. 1, an elastically averaging alignment system 10 includes a first component 100 having a first alignment member 102 and an elastically deformable alignment element 104 in the form of a hollow tube (also herein referred to by reference numeral 104) fixedly disposed with respect to the first alignment member 102, and a second component 200 having a second alignment member 202 and an alignment feature 204 in the form of an aperture (also herein referred to by reference numeral 204) having a plurality of inwardly extending tabs 206 (best seen with reference to FIGS. 3 and 4) fixedly disposed with respect to the second alignment member 202. The aperture 204 with inwardly extending tabs 206 not only serve to provide precise alignment between the first and second components 100, 200, but also serve to provide retention between the first and second components 100, 200 in a self-retaining manner, that is, without the need for additional fasteners, which will be discussed in more detail below.

As illustrated in FIG. 1, an embodiment includes four hollow tubes 104.1, 104.2, 104.3, 104.4 and four mating apertures 204.1, 204.2, 204.3, 204.4. However, it will be appreciated that the scope of the invention is not so limited, and may include any number of hollow tubes 104 with mating apertures 204 consistent with the disclosure herein. When reference is made herein to a hollow tube, a plurality of hollow tubes, or the hollow tubes, reference is made to reference numeral 104, and when reference is made herein to an aperture, a plurality of apertures, or the apertures, reference is made to reference numeral 204.

The elastically deformable hollow tube alignment element 104 is configured and disposed to interferingly, deformably and matingly engage the alignment feature, aperture 204 with tabs 206, in a manner discussed in more detail below, to precisely align and fasten the first component 100 with the second component 200 in two or four directions, such as the +/− x-direction and/or the +/− y-direction of an orthogonal coordinate system, for example, which is herein referred to as two-way or four-way alignment, respectively. Portions of the elastically deformable hollow tube 104 when inserted into the aperture 204 with tabs 206 elastically deform to an elastically averaged final configuration that aligns and retains the first alignment member 102 with the second alignment member 202, and the first component 100 relative to the second component 200, in at least two of four planar orthogonal directions.

For discussion purposes, the mating side of the first alignment member 102 visible in FIG. 1 is labeled 12, and the non-mating side of the second alignment member 202 visible in FIG. 1 is labeled 21. The non-visible sides of the first and second alignment members 102, 202 that are hidden from view in FIG. 1 are herein referred to by reference labels 11 and 22, respectively. For discussion purposes, a plan view of the elastically averaged alignment system 10 as viewed from side 21 of the second component 200 is herein referred to as a front plan view, and a plan view of the elastically averaged alignment system 10 as viewed from side 11 of the first component 100 is herein referred to as a rear plan view.

Figure 2:
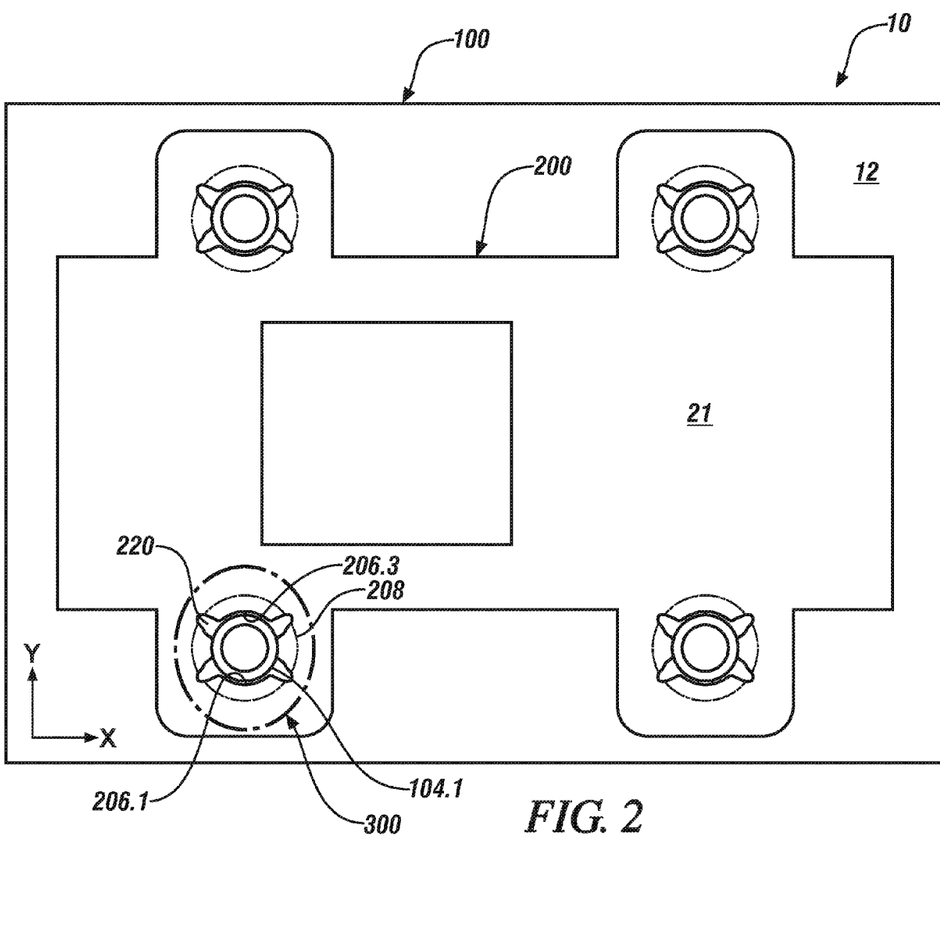
FIG. 2 depicts a front plan view of the elastically averaging self-retaining alignment system of FIG. 1 with the first and second components in an assembled state, in accordance with an embodiment of the invention.

FIG. 2 depicts a plan view of the first and second components 100, 200 in an assembled state, where the first component 100 is a molded plastic first portion (also herein referred to by reference numeral 100) of a vehicle, and the second component 200 is a stamped sheet metal second portion (also herein referred to by reference numeral 200) of the same vehicle. In an embodiment, the thickness 218 of the second alignment member 202 is thinner than the thickness 114 of the first alignment member 102. In an embodiment, the first portion 100 forms part of a dashboard of the vehicle, and the second portion 200 forms part of a glove box of the vehicle. However, it will be appreciated that the first and second components 100, 200 may form other parts of the vehicle having features consistent with the disclosure herein.

Figure 3:
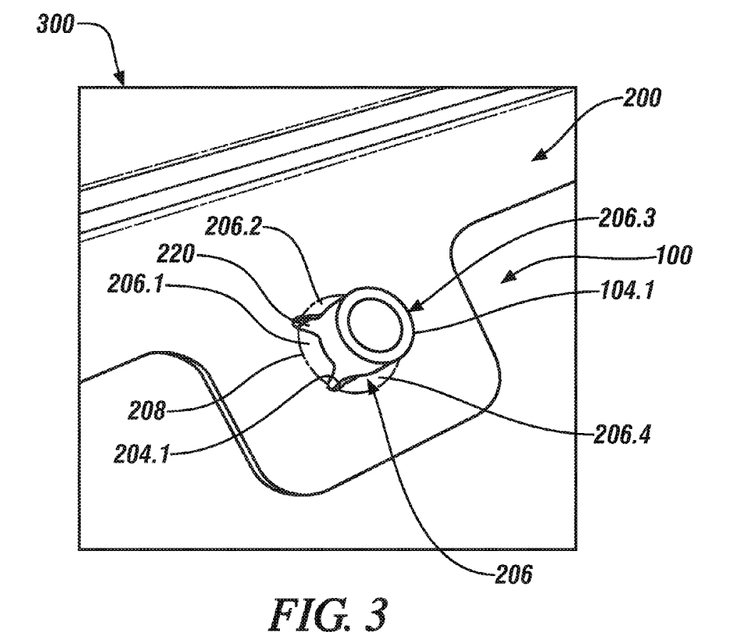
FIG. 3 depicts an expanded perspective view of detail 300 in FIG. 2 with the first and second components in an assembled state, in accordance with an embodiment of the invention.

Reference is now made to FIG. 3 in combination with FIG. 1, where FIG. 3 is an expanded perspective view of detail 300 in FIG. 2. Each hollow tube 104 has a central axis 106 that extends perpendicularly outward from the side 12 (also herein referred to as a first surface) of the first component 100, and each tab 206 extends outward relative to the first surface 12 of the first component 100, thereby facilitating engagement of each hollow tube 104 into each respective alignment feature (aperture 204 plus tabs 206) during assembly of the first and second components 100, 200. In an embodiment, the plurality of tabs 206 are bent in a pre-formed shape to extend outward relative to the first surface 12 of the first component 100 in a z-direction defined by the central axis 106 of the hollow tube 104, which is illustrated by bend lines 208 (also illustrated in FIGS. 5 and 6). To form the tabs 206, slots 220 are provided in the second component 200 at least up to the bend line 208. As depicted in the various figures including FIG. 3, the plurality of tabs 206 includes a first pair of opposing tabs 206.1, 206.3, and a second pair of opposing tabs 206.2, 206.4 orthogonally arranged with respect to the first pair of opposing tabs 206.1, 206.3. In an embodiment, the first pair of opposing tabs 206.1, 206.3 are disposed relative to the respective hollow tube 104 in an interfering structural arrangement that causes the elastically deformable hollow tube 104 when inserted into its respective aperture 204 to elastically deform at the regions of interference (see interference 216, FIG. 6), and the second pair of opposing tabs 206.2, 206.4 are disposed relative to the respective hollow tube 104 in a non-interfering structural arrangement (see clearance 212, FIG. 5), which will now be discussed with reference to FIGS. 4-6.

Figure 4:
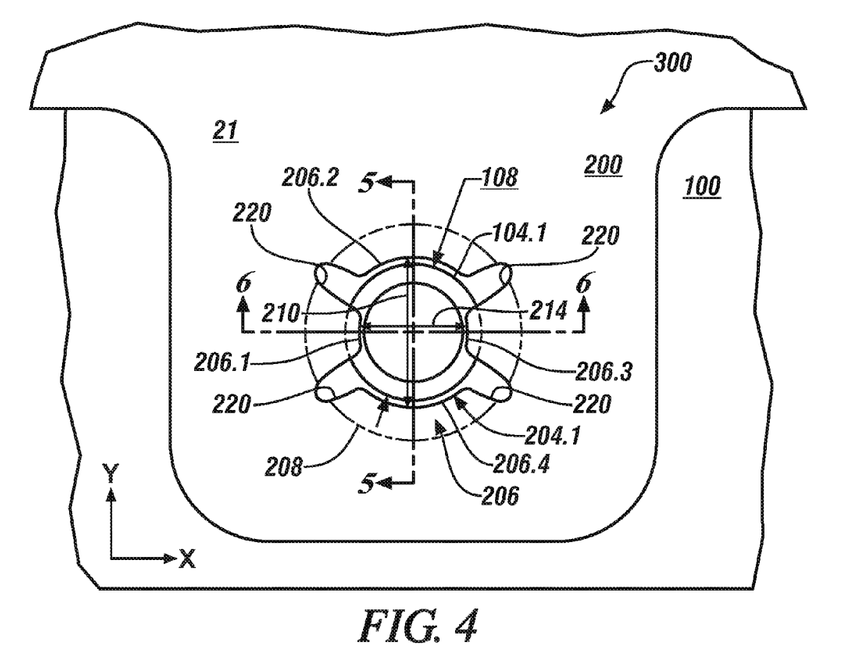
FIG. 4. depicts a front plan view of detail 300 of FIGS. 2 and 3 with the first and second components in a disassembled state just prior to engagement, in accordance with an embodiment of the invention.
Figure 5:
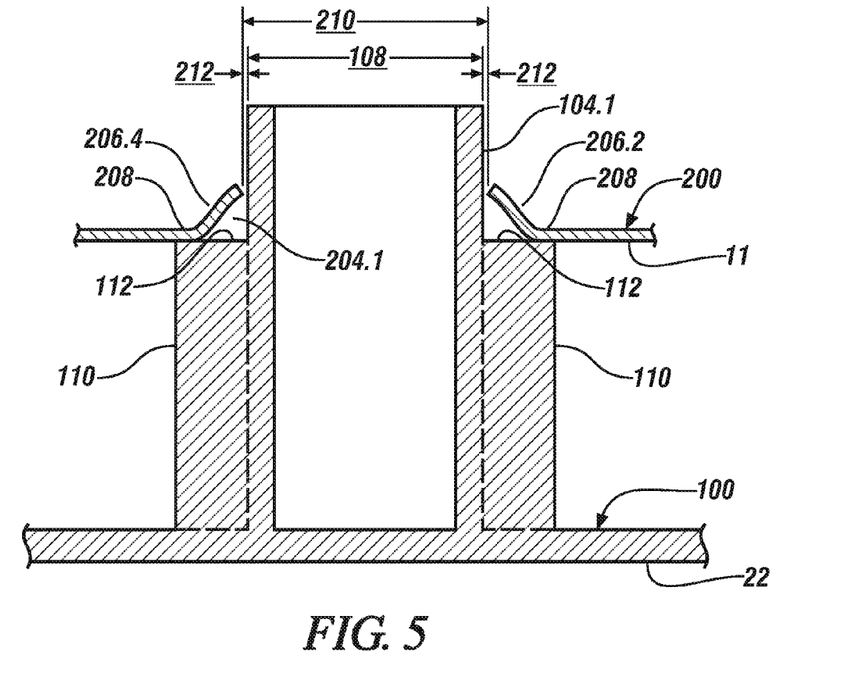
FIG. 5 depicts a section view through cut line 5-5 of FIG. 4 in an assembled state, in accordance with an embodiment of the invention.
Figure 6:
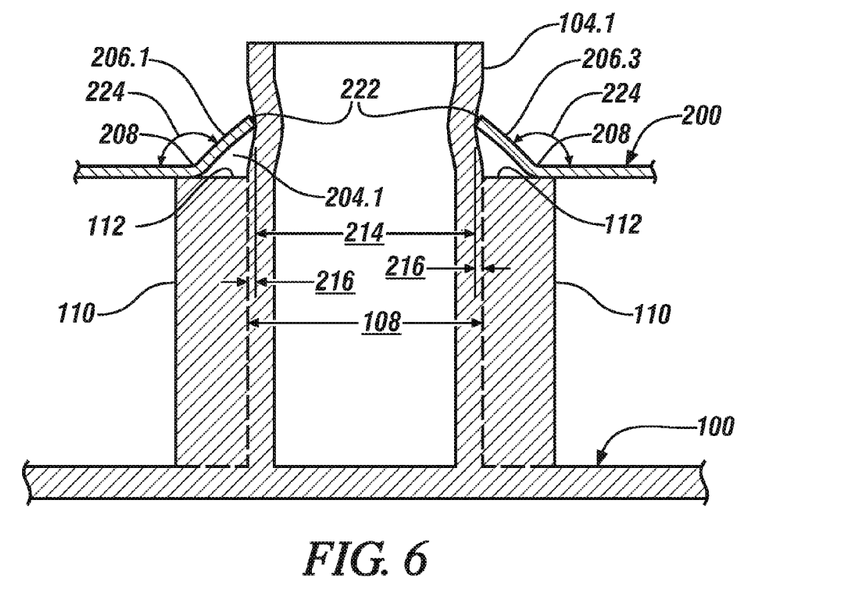
FIG. 6 depicts a section view through cut line 6-6 of FIG. 4 in an assembled state, in accordance with an embodiment of the invention.

FIG. 4 depicts a front plan view of detail 300 of the first and second components 100, 200 just prior to engagement of the hollow tube 104.1 with its respective aperture 204.1, FIG. 5 depicts a section cut along cut lines 5-5 of FIG. 4, but with the hollow tube 104.1 now fully engaged with its respective aperture 204.1, and FIG. 6 depicts a section cut along cut lines 6-6 of FIG. 4, also with the hollow tube 104.1 now fully engaged with its respective aperture 204.1. As depicted in FIGS. 4 and 5, the outer diameter 108 of the hollow tube 104.1 is smaller than the opening 210 across tabs 206.2 and 206.4 creating a clearance 212 therebetween, and as depicted in FIGS. 4 and 6, the outer diameter 108 of the hollow tube 104.1 is greater than the opening 214 across tabs 206.1 and 206.3 creating an interference 216 therebetween. Where the second component 200 is a stamped sheet metal component, the edges 222 (see FIG. 6) of the stamped tabs 206.1, 206.3 will provide a sharp and relatively stiff edge that will tend to dig into the relatively softer plastic material of the hollow tubes 104 when the first and second components 100, 200 are fully engaged with each other, thereby providing a self-retaining arrangement between the hollow tubes 104 and their respective alignment apertures 204. The upward bend 224 (see FIG. 6) of the tabs 206.1, 206.3 serves to facilitate insertion of the hollow tubes 104 into their respective alignment apertures 204, while deterring separation therebetween.

In an embodiment, and with reference to FIGS. 1, 5 and 6, the first component 100 optionally includes a support 110 disposed proximate the hollow tube 104.1 (FIG. 1 depicts only hollow tube 104.1 having optional supports 110, but it will be appreciated that all of the other hollow tubes 104.2, 104.3, 104.4 may also include optional supports 110), where the support 110 has a support surface 112 disposed in such a manner as to support the second component 200 when the hollow tube 104.1 is interferingly, deformably and matingly inserted into its respective aperture 204.1. While reference is made herein to hollow tube 104.1 and aperture 204.1 in relation to support 110 and support surface 112, it will be appreciated that this is exemplary only, and that any or all of the hollow tubes 104 may include an associated support 110 and support surface 112 for a purpose disclosed herein. Optional supports 110 may be integrally formed with the hollow tubes 104 to increase the stiffness of the lower portion of the hollow tubes 104, or may be separated therefrom to increase the flexibility of the upper and lower portions of the hollow tubes 104.

While FIG. 4 depicts the wider opening 210 oriented parallel with the y-axis and the narrower opening 214 oriented parallel with the x-axis to form an elongated aperture, it will be appreciated that this is merely exemplary of just one of many orientations, and that the elongated aperture may be oriented with the wider opening 210 oriented parallel with the x-axis, or oriented at an angle to both the x and y-axes.

In an embodiment, and with reference back to FIG. 1, the first component 100 includes a first and a second hollow tube 104, such as hollow tubes 104.1, 104.4 or 104.2, 104.3 for example, and the second component 200 includes a first and a second respective aperture 204, such as apertures 204.1, 204.4 or 204.2, 204.3 for example, where the first hollow tube 104.1 is configured and disposed to interferingly, deformably and matingly engage the first aperture 204.1, and the second hollow tube 104.4 is configured and disposed to interferingly, deformably and matingly engage the second aperture 204.4. Where both apertures 204.1 and 204.4 are elongated apertures, as discussed above, having their wider openings 210 oriented in a same direction, such as parallel with the x-axis for example, portions of the first and second hollow tubes 104.1, 104.4 when inserted into respective ones of the first and second apertures 204.1, 204.4 elastically deform to an elastically averaged final configuration that aligns and retains the first alignment member 102 with the second alignment member 202 in two of four planar orthogonal directions, such as with respect to the +/− y-directions for example.

Figure 7:
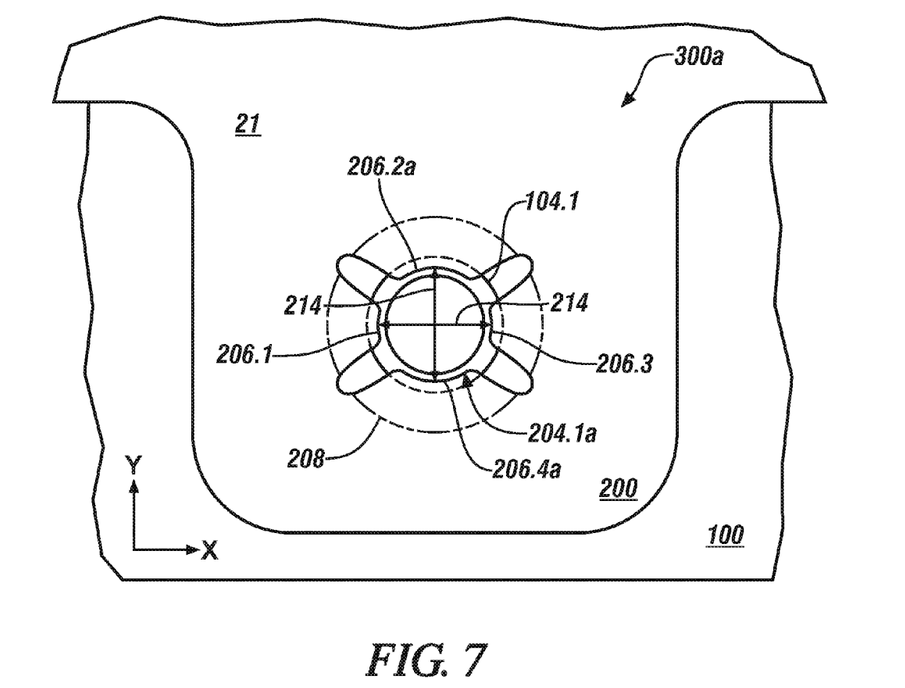
FIG. 7 depicts a front plan view similar to that of FIG. 4, but with an alternative detail 300a, in accordance with an embodiment of the invention.

Reference is now made to FIG. 7, which depicts a front plan view of detail 300a, which is similar to detail 300 depicted in FIG. 4, but with opening 214 across tabs 206.1 and 206.3 being equal to opening 214 across orthogonally oriented tabs 206.2a and 206.4a, thereby creating a same degree of interference 216 (see interference 216 in FIG. 6 for example) between the tab edges of aperture 204.1a and the hollow tube 104.1. Accordingly, an embodiment includes an arrangement where a first pair of opposing tabs 206.1, 206.3 and a second pair of opposing tabs 206.2a, 206.4a are respectively disposed relative to the hollow tube 104.1 in an interfering structural arrangement that causes the elastically deformable hollow tube 104.1 when inserted into its respective aperture 204.1a to elastically deform at the regions of interference (at 216), which will be easily recognized with reference to FIG. 6 for both pairs of opposing tabs. When configured as depicted in FIG. 7, aperture 204.1a is herein referred to as a non-elongated aperture.

In an embodiment, and with reference back to FIG. 1 in combination with FIG. 7, the first component 100 may include a first and a second hollow tube 104, such as hollow tubes 104.1, 104.4 or 104.2, 104.3 for example, and the second component 200 may include a first and a second respective aperture 204, such as apertures 204.1a, 204.4a or 204.2a, 204.3a for example and configured as depicted in FIG. 7, where the first hollow tube 104.1 is configured and disposed to interferingly, deformably and matingly engage the first aperture 204.1a, and the second hollow tube 104.4 is configured and disposed to interferingly, deformably and matingly engage the second aperture 204.4a. Where both apertures 204.1a and 204.4a are non-elongated apertures, as discussed above in connection with FIG. 7, such that portions of the first and second hollow tubes 104.1, 104.4 when inserted into respective ones of the first and second apertures 204.1a, 204.4a elastically deform to an elastically averaged final configuration that aligns and retains the first alignment member 102 with the second alignment member 202 in four planar orthogonal directions, such as with respect to the +/− x-directions and the +/− y-directions for example.

While FIGS. 1-7 depict four tabs 206.1, 206.2, 206.3, 206.4 formed in apertures 204, it will be appreciated that the scope of the invention is not limited to just four tabs, and encompasses any number of tabs suitable for a purpose disclosed herein, such as but not limited to six or eight tabs for example.

In view of all that is disclosed and illustrated herein, in combination with other elastic averaging alignment elements and/or apertures as disclosed in commonly owned, co-pending U.S. patent application Ser. No. 13/187,675, now U.S. Publication No. 2013-0019455A1, for example, it will be appreciated that the scope of the invention is not limited to only the use of the herein disclosed elastically averaged alignment system 10 having elastically deformable hollow tubes 104 configured and disposed to interferingly, deformably and matingly engage respective ones of self-retaining alignment apertures 204 having tabs 206, but also encompasses the use of the herein disclosed elastically averaged alignment system 10 in combination with other elastic averaging alignment features, male or female. By using a plurality of various elastically deformable alignment features, added precision in the alignment and self-retention of the first and second components 100, 200 can result.

When the first component 100 and second component 200 are components of a vehicle, an advantageous assembly results because the clamping force, together with the elastic deformation of the alignment features that has these parts in pressing contact already, reduces the tendency of the components to vibrate or rattle against one another, and thus improves the noise, vibration and harshness (NVH) characteristics of the components and the vehicle in which they are installed. The selective engagement of the elastically deformable alignment element (hollow tube 104) and the alignment feature (aperture 204 with tabs 206) also provides a stiffened assembly of the first component 100 and second component 200 when the first and second components are mutually mated to each other, including a stiffness that is greater than that realized by using the alignment features alone, since the clamping force between the first component and second component increases the stiffness of the assembly, for example.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically averaging self-retaining alignment system, comprising:
   a first component comprising a first alignment member and an elastically deformable alignment element fixedly disposed with respect to the first alignment member, the alignment element comprising a hollow tube;
   a second component comprising a second alignment member and an alignment feature fixedly disposed with respect to the second alignment member, the alignment feature comprising an aperture comprising a plurality of inwardly extending tabs;
   wherein the elastically deformable alignment element is configured and disposed to interferingly, deformably and matingly engage the alignment feature;
   wherein portions of the elastically deformable alignment element when inserted into the alignment feature elastically deform to an elastically averaged final configuration that aligns and retains the first component relative to the second component in at least two of four planar orthogonal directions;

wherein the plurality of tabs comprises a first pair of opposing tabs, and a second pair of opposing tabs spaced apart from the first pair of opposing tabs;

wherein the first pair of opposing tabs are disposed relative to the hollow tube in a non-interfering structural arrangement; and wherein the second pair of opposing tabs are disposed relative to the hollow tube in an interfering structural arrangement that causes the elastically deformable hollow tube when inserted into the aperture to elastically deform at the regions of interference.

2. The elastically averaging self-retaining alignment system of claim 1, wherein:

a central axis of the hollow tube extends perpendicularly outward from a first surface of the first component; and the plurality of tabs also extend outward relative to the first surface of the first component.

3. The elastically averaging self-retaining alignment system of claim 2, wherein:

the plurality of tabs are bent in a pre-formed shape to extend outward relative to the first surface of the first component in a direction defined by the central axis of the hollow tube.

4. The elastically averaging self-retaining alignment system of claim 1, wherein:

the second pair of opposing tabs are orthogonally arranged with respect to the first pair of opposing tabs.

5. The elastically averaging self-retaining alignment system of claim 4, wherein:

the first pair of opposing tabs and the second pair of opposing tabs are respectively disposed relative to the hollow tube in an interfering structural arrangement that causes the elastically deformable hollow tube when inserted into the aperture to elastically deform at the regions of interference.

6. The elastically averaging self-retaining alignment system of claim 1, wherein the first component further comprises:

a support member disposed proximate the hollow tube and having a support surface disposed to support the second component when the hollow tube is interferingly, deformably and matingly inserted into the aperture.

7. The elastically averaging self-retaining alignment system of claim 1, wherein:

the first component comprises a first and a second of the hollow tube;

the second component comprises a first and a second of the aperture;

the first hollow tube is configured and disposed to interferingly, deformably and matingly engage the first aperture;

the second hollow tube is configured and disposed to interferingly, deformably and matingly engage the second aperture; and portions of the first and second hollow tubes when inserted into respective ones of the first and second apertures elastically deform to an elastically averaged final configuration that aligns and retains the first component relative to the second component in two of four planar orthogonal directions.

8. The elastically averaging self-retaining alignment system of claim 5, wherein:

the first component comprises a first and a second of the hollow tube;

the second component comprises a first and a second of the aperture;

the first hollow tube is configured and disposed to interferingly, deformably and matingly engage the first aperture;

the second hollow tube is configured and disposed to interferingly, deformably and matingly engage the second aperture; and portions of the first and second hollow tubes when inserted into respective ones of the first and second apertures elastically deform to an elastically averaged final configuration that aligns and retains the first component relative to the second component in four planar orthogonal directions.

9. The elastically averaging self-retaining alignment system of claim 1, wherein:

the first component comprises a first portion of a vehicle; and the second component comprises a second portion of the vehicle.

10. The elastically averaging self-retaining alignment system of claim 1, wherein:

the first component is made from injection moldable plastic; and the second component is made from stamped sheet metal.

11. The elastically averaging self-retaining alignment system of claim 1, wherein:

a thickness of the second component is less than a thickness of the first component.

* * * * *